(12) United States Patent
Serban et al.

(10) Patent No.: US 10,516,365 B1
(45) Date of Patent: Dec. 24, 2019

(54) DC VOLTAGE CONTROL IN RENEWABLE ENERGY BASED MULTILEVEL POWER CONVERTER

(71) Applicant: SCHNEIDER ELECTRIC SOLAR INVERTERS USA, INC., Livermore, CA (US)

(72) Inventors: Emanuel Serban, New Westminster (CA); Cosmin Pondiche-Muresan, Burnaby (CA)

(73) Assignee: SCHNEIDER ELECTRIC SOLAR INVERTERS USA, INC., Livermore, CA (US)

( * ) Notice: Subject to any disclaimer, the term of this patent is extended or adjusted under 35 U.S.C. 154(b) by 0 days.

(21) Appl. No.: 16/013,301

(22) Filed: Jun. 20, 2018

(51) Int. Cl.
*H02M 3/10* (2006.01)
*H02S 40/32* (2014.01)
(Continued)

(52) U.S. Cl.
CPC ............... *H02S 40/32* (2014.12); *H02M 1/10* (2013.01); *H02M 3/07* (2013.01); *H02M 3/10* (2013.01); *H02M 7/217* (2013.01); *H02M 7/487* (2013.01); *H02M 7/537* (2013.01); *H02M 2001/0067* (2013.01)

(58) Field of Classification Search
None
See application file for complete search history.

(56) References Cited

U.S. PATENT DOCUMENTS

| 9,331,564 | B2 | 5/2016 | Lehmann |
| 9,343,906 | B2 | 5/2016 | Kaiser |

(Continued)

FOREIGN PATENT DOCUMENTS

| EP | 2256579 A1 | 12/2010 |
| EP | 3244523 A1 | 11/2017 |
| WO | 2009155445 A2 | 12/2009 |

OTHER PUBLICATIONS

Celanovic, Nikola et al., "A Comprehensive Study of Neutral-Point Voltage Balancing Problem in Three-Level Neutral-Point-Clamped Voltage Source PWM Inverters," IEEE Transactions on Power Electriconics, vol. 15, No. 2, Mar. 2000, pp. 242-249.

(Continued)

*Primary Examiner* — Jeffrey A Gblende
(74) *Attorney, Agent, or Firm* — Lando & Anastasi, LLP (57) ABSTRACT

According to one aspect, embodiments herein provide a renewable energy-based power converter comprising an input, a high-side DC bus, a low-side DC bus, a first output, an inverter portion configured to convert DC power from the high-side DC bus and the low-side DC bus into output AC power, an interface converter coupled to the high-side DC bus and the low-side DC bus, a first auxiliary DC-DC converter, and a controller, wherein, in a first mode of operation, the DC busses are configured to receive input DC power from the input, and the controller is configured to operate the interface converter to convert DC power from the DC busses into regulated DC power, to operate the interface converter to balance voltage levels of the DC busses, and to operate the first auxiliary DC-DC converter to convert the regulated DC power into first output DC power provided to a DC load.

20 Claims, 7 Drawing Sheets

(51) Int. Cl.
*H02M 1/10* (2006.01)
*H02M 3/07* (2006.01)
*H02M 7/217* (2006.01)
*H02M 7/487* (2007.01)
*H02M 7/537* (2006.01)
*H02M 1/00* (2006.01)

(56) References Cited

U.S. PATENT DOCUMENTS

| | | | | |
|---|---|---|---|---|
| 9,853,567 | B2 | 12/2017 | Flett | |
| 2009/0160254 | A1* | 6/2009 | Wu | H02J 9/062 |
| | | | | 307/66 |
| 2011/0134672 | A1* | 6/2011 | Sato | H02M 1/10 |
| | | | | 363/126 |
| 2014/0376287 | A1* | 12/2014 | Narimani | H02M 3/07 |
| | | | | 363/60 |
| 2018/0019685 | A1* | 1/2018 | Yamashita | H02M 1/32 |
| 2018/0278177 | A1* | 9/2018 | Glovinsky | H02M 3/1584 |

OTHER PUBLICATIONS

Evzelman, Michael et al., "Active Balancing System for Electric Vehicles With Incorporated Low-Voltage Bus," IEEE Transactions on Power Electronics, vol. 31, No. 11, Nov. 2016, pp. 7887-7895.

Grbovic, Petar J., "Loss-Free Balancing Circuit for Series Connection of Electrolytic Capacitors Using an Auxiliary Switch-Mode Power Supply," IEEE Transactions on Power Electronics, vol. 24, No. 21, Jan. 2009, pp. 221-231.

Grbovic, Petar J., "Master/Slave Control of Input-Series-and Output-Parallel-Connected Converters: Concept for Low-Cost High-Voltage Auxiliary Power Supplies," IEEE Transactions on Power Electronics, vol. 24, No. 2, Feb. 2009, pp. 316-328.

Kasper, Matthias et al., "Scaling and Balancing of Multi-Cell Converters," The 2014 International Power Electronics Conference, pp. 2079-2086.

Kroics, Kaspars et al., "A simplified approach to input voltage balancing for series connected isolated DC-DC converters," supported by the Latvian Council of Science (Project Nr. 673/2014), 10 pgs.

Linzen, Dirk et al., "Analysis and Evaluation of Charge-Balancing Circuits on Performance, Reliability, and Lifetime of Supercapacitor Systems," IEEE Transactions on Industry Applications, vol. 41, No. 5, Sep./Oct. 2005, pp. 1135-1141.

Lu, Rengui et al., "Super-Capacitor Stacks Management System With Dynamic Equalization Techniques," IEEE Transactions on Magnetics, vol. 43, No. 1, Jan. 2007, pp. 254-258.

Phung, Thanh Hai et al., "An Optimized Topology for Next-to-Next Balancing of Series-Connected Lithium-ion Cells," IEEE Transactions on Power Electronics, vol. 29, No. 9, Sep. 2014, pp. 4603-4613.

Pou, Josep et al., "Evaluation of the Low-Frequency Neutral-Point Voltage Oscillations in the Three-Level Inverter," IEEE Transactions on Industrial Electronics, vol. 52, No. 6, Dec. 2005, pp. 1582-1588.

Serban, Emanuel et al., "DC-Bus Voltage Range Extension in 1500 V Photovoltaic Inverters," IEEE Journal of Emerging and Selected Topics in Power Electronics, vol. 3, No. 4, Dec. 2015, pp. 901-917.

Serban, Emanuel et al., "Improved PV Inverter Operating Range Using a Miniboost," IEEE Transactions on Power Electronics, vol. 32, No. 11, Nov. 2017, pp. 8470-8485.

Serban, Emanuel et al., "PV Array Voltage Range Extension for Photovoltaic Inverters Using a Mini-Boost," 8 pgs.

Serban, Emanuel et al., "Voltage and Frequency Grid Support Strategies Beyond Standards," IEEE Transactions on Power Electronics, vol. 32, No. 1, Jan. 2017, pp. 298-309.

Zhang, Xianjin et al., "Three-Level DC Converter for Balancing DC 800-V Voltage," IEEE Transactions on Power Electronics, vol. 30, No. 7, Jul. 2015, pp. 3499-3507.

Zhu, Yan et al., "Three-Level Switching Cell for Low Voltage/High-Current DC-DC Converters," IEEE Transactions on Power Electronics, vol. 22, No. 5, Sep. 2007, pp. 1997-2007.

Extended European Search Report from corresponding European Application No. 19181206.4 dated Oct. 25, 2019.

* cited by examiner

DC VOLTAGE CONTROL IN RENEWABLE ENERGY BASED MULTILEVEL POWER CONVERTER

BACKGROUND OF THE INVENTION

Field of the Invention

At least one example in accordance with the present invention relates generally to renewable energy-based multilevel power converters.

Discussion of Related Art

A Photovoltaic (PV) (i.e., solar) inverter is traditionally utilized to convert the DC output of a PV solar panel into an AC output that can be fed into an electrical grid or used by a local, off-grid, electrical network.

SUMMARY

Aspects in accord with the present invention are directed to a renewable energy-based power converter comprising an input configured to be coupled to a renewable energy-based power source and to receive input DC power having an input DC voltage level, a high-side DC bus, a low-side DC bus, a first output configured to be coupled to an AC grid, an inverter portion coupled to the high-side DC bus and the low-side DC bus and configured to convert DC power from the high-side DC bus and the low-side DC bus into output AC power and provide the output AC power to the first output, an interface converter coupled to the high-side DC bus and the low-side DC bus, a first auxiliary DC-DC converter coupled to the interface converter and configured to be coupled to a first DC load, and a controller coupled to the interface converter, wherein, in a first mode of operation, the high-side DC bus and the low-side DC bus are configured to receive the input DC power from the input, and the controller is configured to operate the interface converter to convert DC power from the high-side DC bus and the low-side DC bus into regulated DC power having a regulated DC voltage level, to operate the interface converter to balance a first voltage level on the high-side DC bus with a second voltage level on the low-side DC bus, and to operate the first auxiliary DC-DC converter to convert the regulated DC power into first output DC power provided to the first DC load. In one embodiment, the inverter portion includes a 3-level neutral-point clamped inverter.

According to one embodiment, the renewable energy-based power converter further comprises a neutral point, a high-side capacitor coupled between the high-side DC bus and the neutral point; and a low-side capacitor coupled between the low-side DC bus and the neutral point, wherein in operating the interface converter to balance the first voltage level on the high-side DC bus with the second voltage level on the low-side DC bus, the controller is further configured to operate the interface converter to balance the first voltage level across the high-side capacitor with the second voltage level across the low-side capacitor.

According to another embodiment, in operating the interface converter to balance the first voltage level across the high-side capacitor and the second voltage level across the low-side capacitor, the controller is further configured to operate the interface converter to load at least one of the high-side DC bus and the low-side DC bus with resistance. In one embodiment, the renewable energy-based power converter further comprises a second auxiliary DC-DC converter coupled to the interface converter and configured to be coupled to a second DC load, wherein, in the first mode of operation, the controller is further configured to operate the second auxiliary DC-DC converter to convert the regulated DC power into second output DC power provided to the second DC load.

According to one embodiment, the renewable energy-based power converter further comprises an input switch coupled to the input, wherein the controller is further configured, in the first mode of operation, to operate the input switch to couple the input to the high-side DC bus and the low-side DC bus. In one embodiment, the renewable energy-based power converter further comprises an auxiliary AC-DC converter coupled to the first output and the interface converter, wherein, in a second mode of operation, the controller is further configured to operate the input switch to decouple the input from the high-side DC bus and the low-side DC bus, to operate the auxiliary AC-DC converter to convert AC power from the AC grid into the regulated DC power having the regulated DC voltage level, to operate the interface converter to convert the regulated DC power into DC bus power to charge the high-side capacitor and the low-side capacitor, and to operate the interface converter to balance the first voltage level across the high-side capacitor and the second voltage level across the low-side capacitor.

According to another embodiment, the controller is further configured to operate in the second mode of operation prior to operating in the first mode of operation. In one embodiment, the renewable energy-based power converter further comprises an output switch coupled between the inverter portion and the first output, wherein the controller is further configured to operate the output switch to decouple the first output from the inverter portion in the second mode of operation and to couple the first output to the inverter in the first mode of operation.

According to one embodiment, the renewable energy-based power converter further comprises an Electric Energy Storage (EES) device coupled to the interface converter and the first auxiliary DC-DC converter. In another embodiment, the renewable energy-based power converter further comprises a second output coupled to the inverter portion and configured to be coupled to an AC load, wherein the inverter portion is further configured to provide the output AC power to the AC load via the second output. In one embodiment, the interface converter includes a non-isolated bi-directional converter. In another embodiment, the interface converter includes an isolated bi-directional converter.

Another aspect in accord with the present invention is directed to a method for operating a renewable energy-based power converter including an input configured to be coupled to a renewable energy-based power source, a high-side DC bus, a low-side DC bus, and an output configured to be coupled to an AC grid, wherein the method comprises receiving, at the input, input DC power from the renewable energy-based power source, providing, in a first mode of operation, the input DC power to the high-side DC bus and the low-side DC bus, converting, in the first mode of operation with an inverter portion, DC power from the high-side DC bus and the low-side DC bus into output AC power, providing, in the first mode of operation, DC power from the high-side DC bus and the low-side DC bus to an interface converter, converting, in the first mode of operation with the interface converter, DC power from the high-side DC bus and the low-side DC bus into regulated DC power having a regulated DC voltage level, converting, in the first mode of operation with a first auxiliary DC-DC converter, the regulated DC power into first output DC power, providing the first output DC power to a first DC load, and balancing, in the first mode of operation with the interface converter, a voltage level of the high-side DC bus with a voltage level of the low-side DC bus.

According to one embodiment, the renewable energy-based power converter further includes a neutral point, a high-side capacitor coupled between the high-side DC bus and the neutral point, and a low-side capacitor coupled between the low-side DC bus and the neutral point, and balancing includes balancing the voltage level across the high-side capacitor with the voltage level across the low-side capacitor. In one embodiment, balancing further includes loading at least one of the high-side DC bus and the low-side DC bus with a virtual resistance. In another embodiment, the method further comprises converting, in the first mode of operation with a second auxiliary DC-DC converter, the regulated DC power into second output DC power, and providing the second output DC power to a second DC load.

According to another embodiment, the method further comprises decoupling, in a second mode of operation, the input from the high-side DC bus and the low-side DC bus, converting, in the second mode of operation with an auxiliary AC-DC converter, AC power from the AC grid into the regulated DC power having the regulated DC voltage level, converting, in the second mode of operation with the interface converter, the regulated DC power into DC bus power, charging, with the DC bus power, the high-side capacitor and the low-side capacitor, and balancing, in the second mode of operation, the first voltage level across the high-side capacitor and the second voltage level across the low-side capacitor. In one embodiment, the method further comprises coupling, in the first mode of operation, the input to the high-side DC bus and the low-side DC bus, wherein decoupling, in the second mode of operation, is performed prior to coupling, in the first mode of operation.

At least one aspect in accord with the present invention is directed to a renewable energy-based power converter comprising an input configured to be coupled to a renewable energy-based power source and to receive input DC power having an input DC voltage level, a high-side DC bus, a low-side DC bus, a neutral point, a high-side capacitor coupled between the high-side DC bus and the neutral point, a low-side capacitor coupled between the low-side DC bus and the neutral point, an output configured to be coupled to an AC grid, an inverter portion coupled to the high-side DC bus and the low-side DC bus and configured to operate to convert DC power from the high-side DC bus and the low-side DC bus into output AC power and provide the output AC power to the output, and means for providing regulated DC power, derived from the input DC power, to at least one DC subsystem, for balancing a first voltage level on the high-side DC bus with a second voltage level on the low-side DC bus, and for pre-charging, prior to operating the inverter portion to convert DC power from the high-side DC bus and the low-side DC bus into output AC power, the high-side capacitor and the low-side capacitor.

BRIEF DESCRIPTION OF THE DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As described above, PV inverters are commonly utilized to convert the DC output of a PV solar panel into an AC output that can be fed into an electrical grid or used by a local, off-grid, electrical network. For example, in a traditional PV inverter configuration, a PV inverter is coupled directly to an electrical grid (e.g., utility grid) and AC power generated by the PV inverter (based on DC power received from a PV solar panel) is provided to the grid. AC power from the grid can also be drawn by the PV inverter. At least one conventional topology for a PV inverter includes a split DC bus where it is generally desirable to balance DC voltage between the two DC busses and limit inrush transients to avoid electrical stress and potentially irreversible damage to components of the inverter. One common approach for DC bus balancing in a PV inverter is to utilize resistive-type dissipative elements when the inverter is in an inactive mode. However, such elements can be relatively expensive, inefficient, and limited in capability.

Additionally, traditional power converters typically include a power system that provides required power to different subsystems (e.g., a Digital Signal Processor (DSP), microcontroller, fan, control and communication systems, gate driver, etc.) of the power converter. However, the integration of such power systems (and corresponding subsystems) with a split-bus renewable energy-based multilevel converter (e.g., a PV inverter as described above) can be difficult due to the relatively high conversion requirements of such a PV inverter. High voltage power components can be utilized in a PV inverter to handle the conversion; however, such components are expensive and do not provide voltage balancing/current transient mitigation functions.

A power converter architecture is provided herein that integrates DC voltage balancing and power supply features for renewable energy-based multilevel power converters. The architecture provides a control structure that performs both DC balancing at an input port and voltage regulation at an output port. The architecture can also operate a pre-charge function for start-up initializing conditions to reduce inrush current and operate to reduce DC ripple for higher DC-bus voltage utilization.

Figure 1:
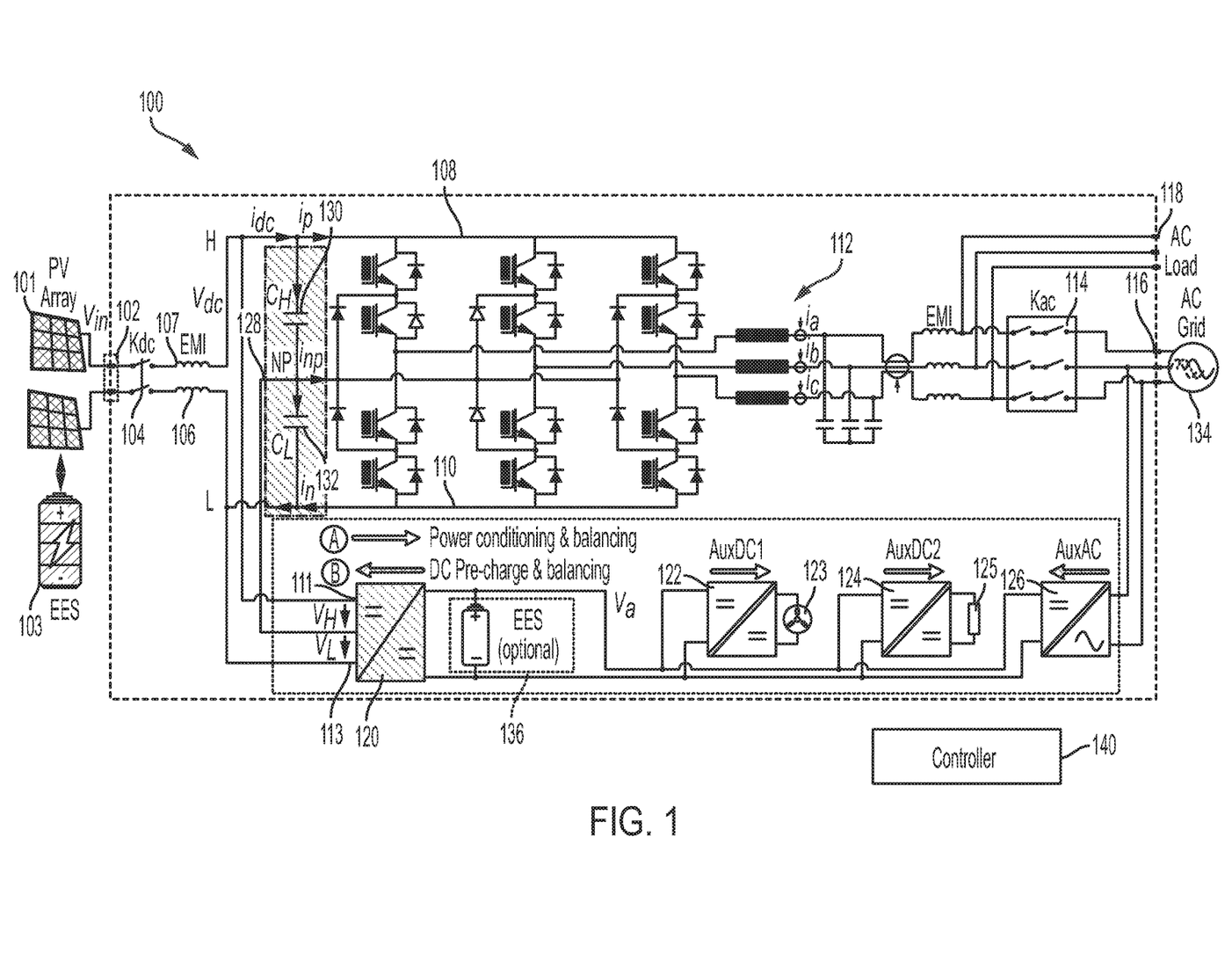
FIG. 1 is a schematic diagram of a renewable energy-based multilevel inverter in accordance with aspects of the present invention.

FIG. 1 is a block diagram of a multilevel power converter 100 (i.e., a PV inverter) according to aspects described herein. The PV inverter 100 includes an input 102, an input switch (Kdc) 104, a first EMI inductor 106, a second EMI inductor 107, a high-side bus 108, a low-side bus 110, an inverter portion 112, an output switch 114, a first output 116, a second output 118, an interface converter (3LIC) 120, a first auxiliary DC-DC converter 122, a second auxiliary DC-DC converter 124, an auxiliary AC-DC converter 126, a neutral point (NP) 128, a high-side capacitor 130, a low-side capacitor 132, and a controller 140. According to one embodiment, the first auxiliary DC-DC converter 122 and the second auxiliary DC-DC converter 124 are isolated converters (e.g., a flyback or forward converter); however, in other embodiments, the first auxiliary DC-DC converter 122 and the second auxiliary DC-DC converter 124 are different types of converters. In one embodiment, the input switch 104 is a relay; however, in other embodiments, the input switch 104 can be some other type of switch. In one embodiment, the inverter portion is a 3-level neutral-point clamped (NPC) inverter; however, in other embodiments, a different type of inverter may be utilized.

The input 102 is configured to be coupled to a Photovoltaic (PV) Array. The PV Array may be coupled to an Electric Energy Storage (EES) device 103. The input is selectively coupled to the first EMI inductor 106 and the second EMI inductor 107 via the input switch 104. The high-side bus 108 is coupled to the input switch 104 via the first EMI inductor 106. The low-side bus 110 is coupled to the input switch 104 via the second EMI inductor 107. The high-side capacitor 130 is coupled between the high-side bus 108 and the neutral point 128. The low-side capacitor 132 is coupled between the low-side bus 110 and the neutral point 128. The inverter is coupled to the high-side bus 108, the low-side bus 110, the second output 118, and the output switch 114. The output switch is also coupled to the first output 116.

The interface converter 120 is coupled to the neutral point 128, the high-side bus 108, and the low-side bus 110. For example, in at least one embodiment, the interface converter 120 includes a high-side interface 111 coupled to the high-side bus 108 and a low-side interface 113 coupled to the low-side bus 110. The interface converter 120 is further coupled to the first auxiliary DC-DC converter 122, the second auxiliary DC-DC converter 124, and the auxiliary AC-DC converter 126. The first auxiliary DC-DC converter 122 is configured to be coupled to a first DC load 123. The second auxiliary DC-DC converter 124 is configured to be coupled to a second DC load 125. The AC-DC converter 126 is also coupled to the first output 116. The first output 116 is configured to be coupled to an AC grid 134. The second output 118 is configured to be coupled to at least one AC load. According to at least one embodiment, an EES device 136 (e.g., a mini-EES system) is coupled to the interface converter 120, the first auxiliary DC-DC converter 122, the second auxiliary DC-DC converter 124, and the auxiliary AC-DC converter 126. In another embodiment, the EES device 136 is removed. The controller 140 is coupled to different components of the system 100 and is configured to transmit control signals to different components of the system 100, The PV array 101 provides input DC power to the input 102. In one embodiment, the input voltage ($V_{in}$) of the input DC power provided to the input 102 varies within a 500-2000V range; however, in other embodiments, the DC power provided to the input 102 is configured differently. The input DC power is provided to the inverter 112 via the closed input switch 105, the first and second EMI inductors 106, 107, and the high-side and low-side busses 108, 110. The controller 140 operates the inverter 112 (e.g., switches of the inverter 112) to convert the DC power received from the busses 108, 110 into output AC power. The output AC power can be provided to at least one AC load coupled to the second output 188 and the AC grid 134 coupled to the first output 116 (via the closed output switch 114). In one embodiment, the output AC power is 3-phase AC power; however, in other embodiments, the output AC power can be configured differently.

The interface converter 120 can also receive the input DC power from the input 102 via the closed input switch 105 and the first and second EMI inductors 106, 107. The interface converter 120 converts the input DC power into regulated DC power having a regulated voltage level ($V_a$) and provides the regulated DC power to the first auxiliary DC-DC converter 122 and the second auxiliary DC-DC converter 124. Each of the first auxiliary DC-DC converter 122 and the second auxiliary DC-DC converter 124 can convert the regulated DC power into output DC power and provide the output DC power to a corresponding DC load 123, 125 (e.g., internal loads such as cooling fans, microprocessor control boards, a communication interface, a power device gate driver, etc.). Each of the first auxiliary DC-DC converter 122 and the second auxiliary DC-DC converter 124 can also convert DC power from the EES device 136 into the output DC power. The auxiliary AC-DC converter 126 can receive input AC power from the AC grid 134 (e.g., if DC power from the interface converter 120 or EES device 136 is unavailable), convert the input AC power into the output DC power and provide the output DC power to the first auxiliary DC-DC converter 122 and the second auxiliary DC-DC converter 124. Different operational modes of the system 100 are described in greater detail below.

In a power conditioning and voltage balancing mode of operation, the interface converter 120 receives the input DC power having a DC voltage level between 500-2000V and converts the input DC power into DC power having a voltage level (e.g., $V_a$=400V), as described above. The interface converter 120 can also perform voltage balancing with voltage regulation across the high-side capacitor 130 and the low-side capacitor 132.

A typical performance index for a power conversion system is DC bus voltage utilization. For example, a wider input DC voltage range for a PV inverter can allow higher energy harvesting. In 3-level converters, the neutral point (NP) is typically compensated under all modes of operating: converter stand-by, power conversion with active, reactive power, and with different power factor (PF) conditions. The 3-phase 3-level DC bus capacitance can be described by the following dynamics (with response to the system 100 of FIG. 1):

$$\begin{cases} C_H \dfrac{dv_H}{dt} = i_{dc} - i_p \\ C_L \dfrac{dv_L}{dt} = i_{dc} - i_n \\ i_{np} = i_n - i_p, \end{cases} \quad (1)$$

where the currents $i_p$ and $i_n$ are related to the inverter phase currents $i_a$, $i_b$, $i_c$. When the three phases of the 3-level converter are clamped to the neutral point (NP) 128, then the inductor currents ($i_a$, $i_b$, $i_c$) contribute to the NP current, which can be given by the following expression:

$$\begin{cases} i_{np} = s_a i_a + s_b i_b + s_c i_c \\ s_{xi}\Big|_{\substack{x=a,b,c \\ i=\overline{1,4}}} \in \{0, 1\}, \end{cases} \quad (2)$$

where the binary switching state $s_{xi}$ can take the values shown in Table 1, shown below.

TABLE I

3-Level NPC Converter phase Switching states

| $V_{xz\backslash x=a,b,c}$ | $S_{x1}$ | $S_{x2}$ | $S_{x3}$ | $S_{x4}$ |
|---|---|---|---|---|
| $V_{dc}/2$ | 1 | 1 | 0 | 0 |
| 0 | 0 | 1 | 1 | 0 |
| $-V_{dc}/2$ | 0 | 0 | 1 | 1 |

$$s_{xi}\Big|_{\substack{x=a,b,c \\ i=\overline{1,4}}} = \begin{cases} 1 & \text{if } T_{xi} = \text{on} \\ 0 & \text{if } T_{xi} = \text{off} \end{cases} \quad (3)$$

The voltage balance between the voltage ($V_H$) on the high-side bus 108 and the voltage ($V_L$) on the low-side bus 110 is maintained as long as the average value of current through the neutral point (NP) 128 is zero:

$$\overline{i_{np}} = \overline{i_n} - \overline{i_p} = 0 \quad (4)$$

The current flow into the neutral point (NP) 128 produces an instantaneous voltage deviation determined by the size of the DC-link capacitance, amplitude of the phase currents, and power factor operation. The DC bus and the neutral point deviation can be given by the following equations:

$$\begin{cases} V_{dc} = V_H + V_L \\ \Delta v_{np} = V_H - V_L \end{cases} \quad (5)$$

The control of the interface converter (e.g., by the controller 140) balances the voltages on the DC busses 108, 110, by loading its dc rails (i.e., the high-side interface 111 and the low-side interface 113) with virtual resistances $r_H$, $r_L$, and the state equations are given by:

$$\begin{cases} C_H \dfrac{dv_H}{dt} = i_p - \dfrac{v_H}{r_H} \\ C_L \dfrac{dv_L}{dt} = i_n - \dfrac{v_L}{r_L} \end{cases} \quad (6)$$

An increase in DC-bus voltage utilization of the system 100 can be achieved by reducing, through the DC bus voltage balancing described above, the neutral point (NP) 128 voltage deviation. In addition, since the interface controller 120 can be controlled independently from the inverter 112, voltage ripple (e.g. third harmonic of line frequency, h=3) can be reduced without distorting the converter currents (i.e., power quality).

According to one embodiment, voltage balancing can be designed for neutral point (NP) 128 compensation using a proportional-resonant voltage regulator:

$$\begin{cases} G_{np}(s) = k_p + \dfrac{s \cdot \omega_0 \cdot k_{rir}}{s^2 + (2 \cdot \xi \cdot \omega_0)s + \omega_0^2} \\ \omega_0 = h \cdot \omega_L \end{cases} \quad (7)$$

where $k_p$ is the proportional gain (i.e., it sets the bandwidth and stability phase margin), and $k_r$ is the resonant gain (at a selected resonant frequency) of the neutral point (NP) 128 voltage regulator. The high gain of the regulator can allow the regulator to eliminate the steady-state error in the closed loop for the selected frequency of operation.

Figure 2:
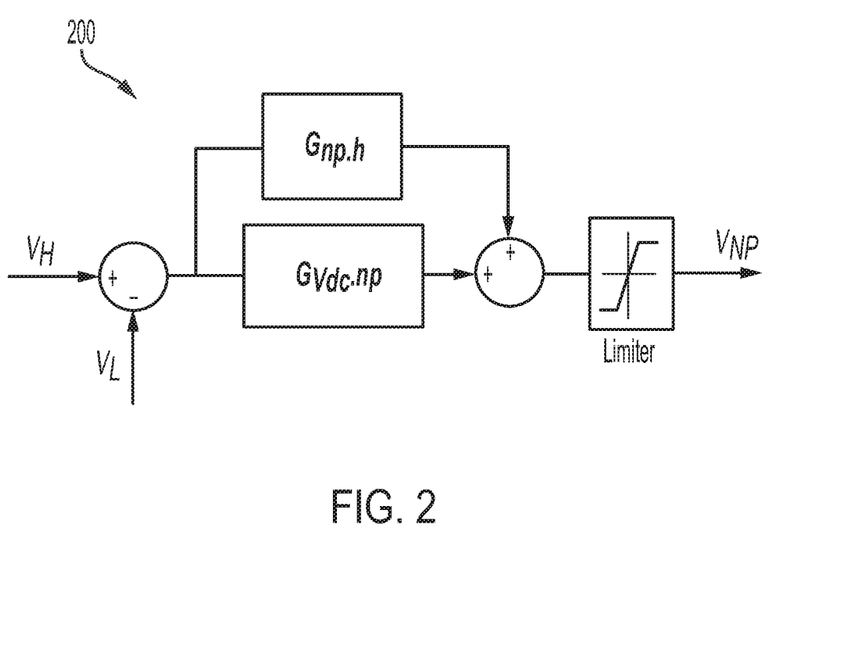
FIG. 2 is a block diagram illustrating one embodiment of a neutral point voltage regulator in accordance with aspects of the present invention.

FIG. 2 is a block diagram illustrating one embodiment of a neutral point (NP) 128 voltage regulator 200 configured to track and minimize the amplitude of periodic signals, that can be decomposed into sinusoidal harmonics (for example, h=3, $\omega_L$=2π$f_L$ with proportional $k_p$ and resonant gain $k_r$). The neutral point (NP) 128 voltage regulator 200 can be utilized to extend DC bus utilization by damping sinusoidal harmonics contained in the DC bus voltages ($V_H$ and $V_L$).

The interface converter 120 can also operate in a DC precharge and power balancing mode of operation. According to at least one embodiment, DC precharge can be performed at start-up, prior to power conversion being performed on power received from the PV array 101 (i.e., by the inverter 100). For example, at power system start-up, when the input switch (Kdc) 104 is closed, an inrush current transient can occur between the power source (e.g., the PV array 101, the electrical energy storage device 102) and the DC bus coupled capacitors (i.e., the high-side capacitor 130 and the low side capacitor 132). The inrush current can degrade the performance and lifetime of the input switch (Kdc) 104 and the capacitors 130, 132. This negative effect can be eliminated by pre-charging the capacitors 130, 132 to a voltage level regulated by the interface converter 120. In addition, the voltage applied to the capacitors 130, 132 can be controlled and balanced to avoid damage or over-stress to the capacitors 130, 132 during the pre-charge process. This can extend the lifetime of the capacitors 130, 132 and the input switch (Kdc) 104 and/or allow for the use of lower quality switches.

As shown in FIG. 1, the interface converter 120 is interfaced between the capacitors 130, 132 and the internal auxiliary power converters (i.e., the first auxiliary DC-DC converter 122, the second auxiliary DC-DC converter 124, and the auxiliary AC-DC converter 126). At the presence of AC grid power, the auxiliary AC-DC converter 126 converts the AC grid power into DC power provided to the first auxiliary DC-DC converter 122, the second auxiliary DC-DC converter 124, and the interface converter 120, and regulates the voltage level ($V_a$) of the DC power to a desired level (e.g., 400V). The interface converter 120 converts the DC power at the $V_a$ voltage level to DC power at a DC bus voltage level ($V_{dc}$). The interface converter 120 converts the DC power by pre-charging the high-side capacitor 130 and the low-side capacitor 132 and satisfying the following condition:

$$\begin{cases} \dfrac{|V_H - V_L|}{V_{dc}} < \alpha_1 \\ \left|1 - \dfrac{V_{dc}}{V_{in}}\right| < \alpha_2 \end{cases}, \quad (8)$$

where $a_1$, $a_2$ are the specified design limits (e.g. 1%) to achieve the desired regulation voltage level. Once the condition of equation 8 is satisfied, the input switch (Kdc) 104 can be closed and inrush current can be eliminated since the DC bus voltage level ($V_{dc}$) is the same in magnitude with input voltage ($V_{in}$). At this time, the output switch 114 can be closed and the system 100 is ready to convert energy (e.g., from the PV array 101/EES device 103 to the outputs 116, 118).

According to at least one embodiment, DC precharge can also be performed when the DC input source (e.g., the PV array 101/EES device 103) is absent and AC grid reactive power compensation is desired. For example, if the DC busses 108, 110 are discharged (e.g., while the input switch (Kdc) 104 is open) and AC grid power is provided to the first output 116 (e.g., $V_{LN}$=277V/$V_{LL}$=480V), when the output switch 114 is turned on, an inrush current can occur between the AC grid 134 (i.e., the first output 116) and the bus capacitors (130, 132). The inrush current may damage or degrade the performance and lifetime of the output switch 114, the bus capacitors 130, 132, and/or the diodes of the inverter portion 112. This negative effect can be eliminated by pre-charging the capacitors 130, 132.

For example, when the AC grid 134 is available, the auxiliary AC-DC converter 126 converts the AC grid power into DC power provided to the first auxiliary DC-DC converter 122, the second auxiliary DC-DC converter 124, and the interface converter 120, and regulates the voltage level ($V_a$) of the DC power to a desired level (e.g., 400V). The interface converter 120 converts the DC power at the $V_a$ voltage level to DC power at a DC bus voltage level ($V_{dc}$). The interface converter 120 converts the DC power by pre-charging the high-side capacitor 130 and the low-side capacitor 132 and satisfying the following condition:

$$\begin{cases} \dfrac{|V_H - V_L|}{V_{dc}} < \alpha_1 \\ \left|1 - \dfrac{V_{dc}}{V_{LN}\sqrt{6}}\right| < \alpha_3 \end{cases}, \quad (9)$$

where $a_1$, $a_3$ are the specified design limits (e.g. 1%) to achieve the desired voltage regulation. Once the condition of equation 9 is satisfied, the output switch 114 can be closed, an inrush current transient through the switch 114 can be eliminated, and the system is ready to perform reactive power compensation to the first output 116.

As described above and according to at least one embodiment, an EES device 136 (e.g., a mini-EES system) can be coupled to the interface converter 120, the first auxiliary DC-DC converter 122, the second auxiliary DC-DC converter 124, and the auxiliary AC-DC converter 126. Such an EES device 136 can provide enhanced functionality, particularly when the input 102 is connected to the PV array 101. For example, the EES device 136 can be configured to complement the PV array 101 based power conversion. More specifically, transient cloud fields traditionally cause variability in PV energy production and the impact of a sudden change in PV power production (e.g., due to a cloud) can impact AC grid stability. Accordingly, the EES device 136 can be configured to smooth the PV array 101 production and enhance grid stability.

Figure 3:
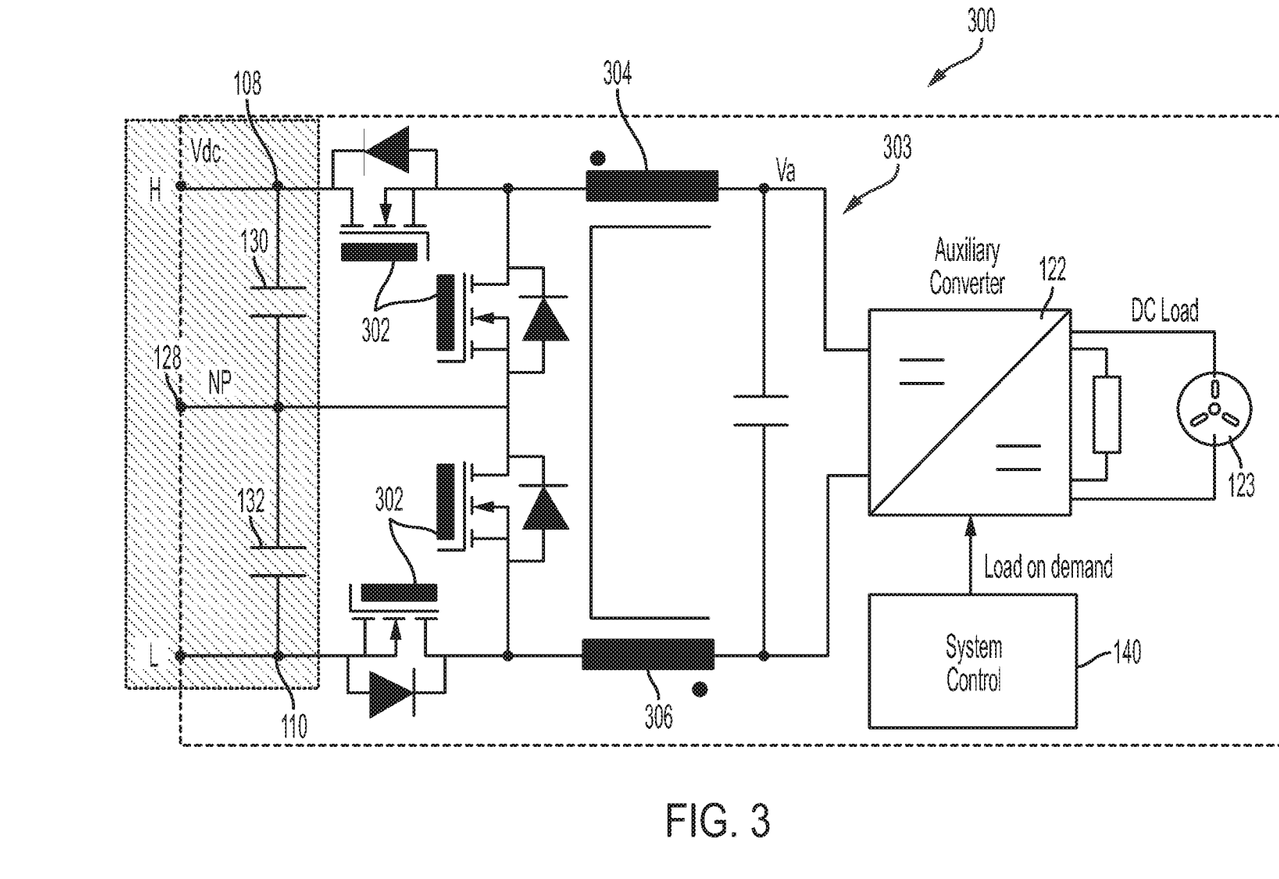
FIG. 3 is a schematic diagram of one embodiment of an interface converter in accordance with aspects of the present invention.
Figure 4:
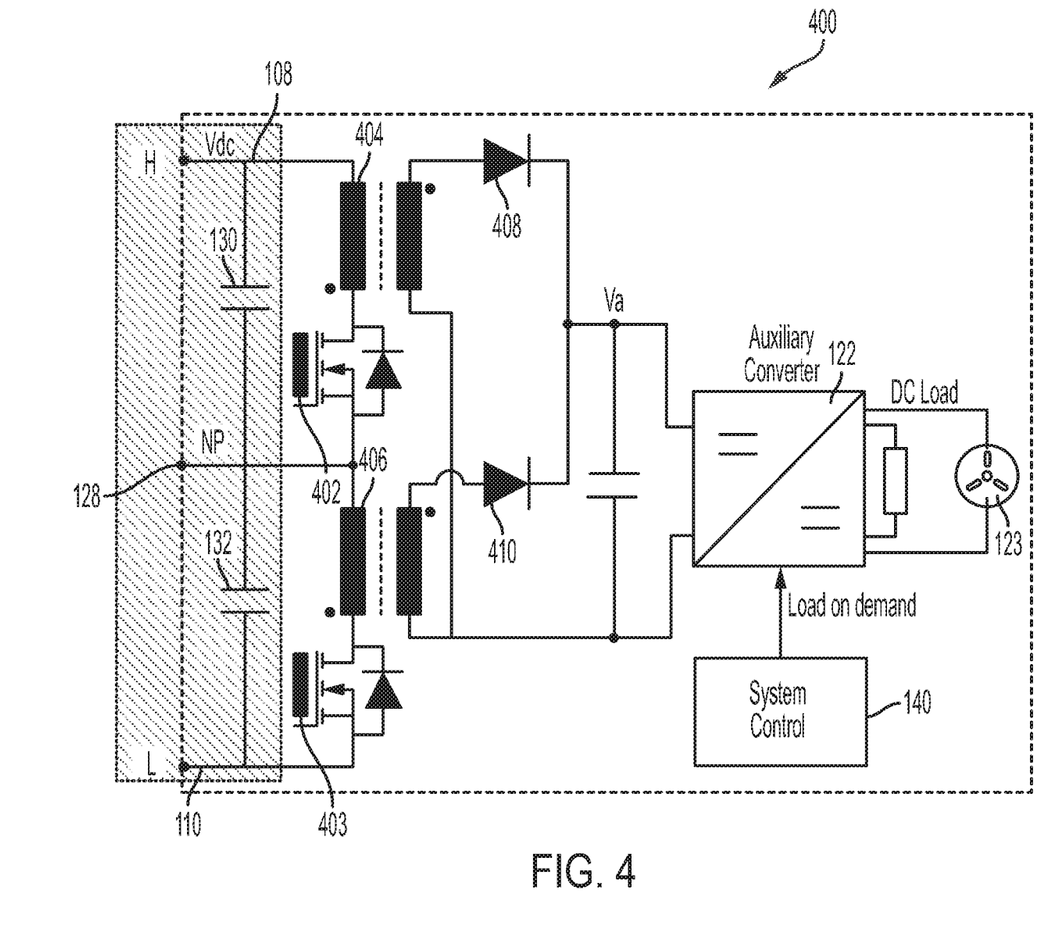
FIG. 4 is a schematic diagram of another embodiment of an interface converter in accordance with aspects of the present invention.
Figure 5:
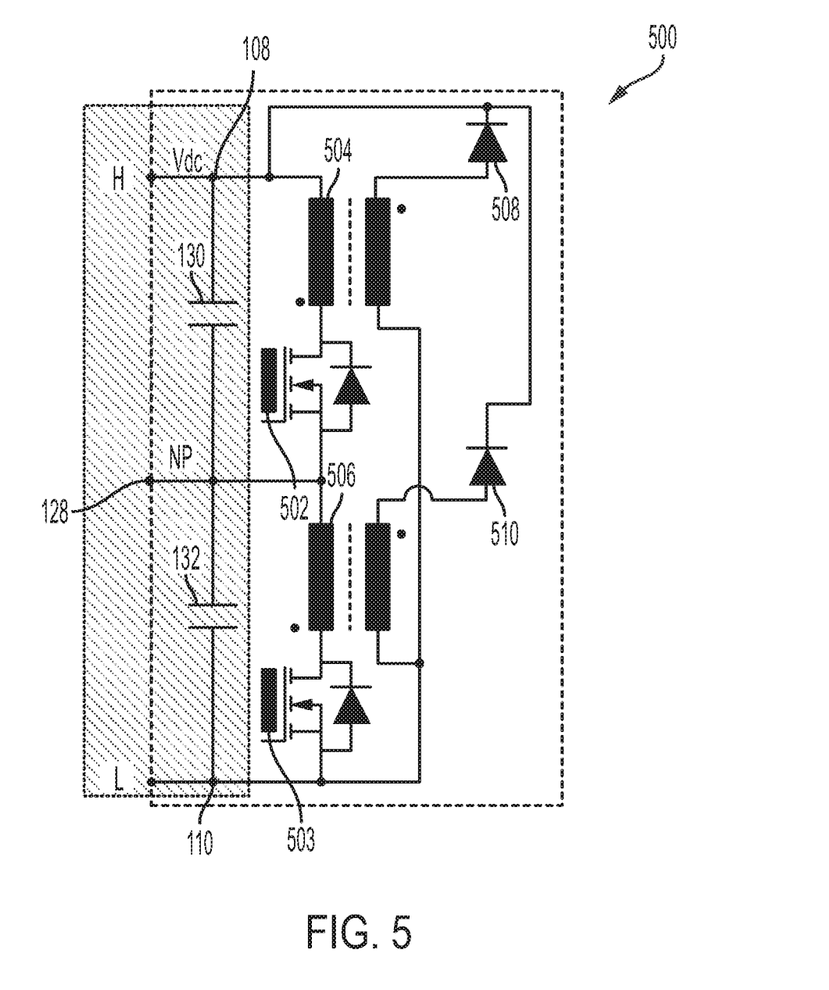
FIG. 5 is a schematic diagram of one embodiment of an interface converter in accordance with aspects of the present invention.

FIGS. 3-5 include more detailed schematic diagrams of different embodiments of the interface converter 120. As shown in FIG. 3, in one embodiment, the interface converter 120 is a non-isolated bi-directional converter 300. The converter 300 includes a plurality of switches 302, and a coupled inductor filter 303. The plurality of switches 302 is coupled to the high-side bus 108, the low-side bus 110, and the neutral point 128. A first inductor 304 and a second inductor 306 of the filter 303 are coupled between the plurality of switches 302 and the internal auxiliary converters (e.g., the first auxiliary DC-DC converter 122, the second auxiliary DC-DC converter 124, and the auxiliary AC-DC converter 126).

The topology of FIG. 3 is a relatively high efficiency solution where, depending on the current mode of operation, the controller 140 can operate the switches 302 to provide power conditioning, bus balancing, and/or a pre-charge function, as described above. For example, the controller 140 can operate the switches 302 to convert DC power from the busses 108, 110, having a voltage level of VDC, into DC power having a voltage level of $V_a$ (i.e., to be provided to the auxiliary DC-DC converter 122), or convert DC power having a voltage level of $V_a$, from the auxiliary AC-DC converter 126, into DC power having the appropriate DC voltage level ($V_{DC}$). In such a topology as FIG. 3, galvanic isolation can be provided by a separate converter or by the auxiliary converters 122, 124, 126.

As shown in FIG. 4, in one embodiment, the interface converter 120 is an isolated auxiliary power supply with dual-flyback topology 400. The supply 400 includes a first switch 402, a second switch 403, a first transformer 404, a second transformer 406, a first diode 408, and a second diode 410. A first end of a first winding of the first transformer 404 is coupled to the high-side bus 108. A second end of the first winding of the first transformer 404 is coupled to the neutral point 128 via the first switch 402. A first end of a first winding of the second transformer 406 is coupled to the neutral point 128. A second end of the first winding of the second transformer 406 is coupled to the low-side bus 110 via the second switch 403. A first end of a second winding of the first transformer 404 is coupled to an anode of the first diode 408. A first end of a second winding of the second transformer 406 is coupled to an anode of the second diode 410. The cathode of the first diode 408, the cathode of the second diode 410, and a second end of the second winding of the second transformer 406 are coupled to the internal auxiliary converters (e.g., the first auxiliary DC-DC converter 122, the second auxiliary DC-DC converter 124, and the auxiliary AC-DC converter 126). A second end of the second winding of the first transformer 404 is also coupled to the second end of the second winding of the second transformer 406.

With the topology of FIG. 4, the controller 140 can operate the switches 402, 403, in conjunction with the transformers 404, 406 to provide power conditioning and bus balancing while also providing isolation between VDC and $V_a$. However, because the system 400 is uni-directional, the pre-charge function described above cannot typically be implemented.

As shown in FIG. 5, in one embodiment, the interface converter 120 is a dual flyback topology with an isolated interface DC-power recycler 500. The topology of FIG. 5 includes a first switch 502, a second switch 503, a first transformer 504, a second transformer 506, a first diode 508, and a second diode 510. A first end of a first winding of the first transformer 504 is coupled to the high-side bus 108. A second end of the first winding of the first transformer 504 is coupled to the neutral point 128 via the first switch 502. A first end of a first winding of the second transformer 506 is coupled to the neutral point 128. A second end of the first winding of the second transformer 506 is coupled to the low-side bus 110 via the second switch 503. A first end of a second winding of the first transformer 504 is coupled to an anode of the first diode 508. A first end of a second winding of the second transformer 506 is coupled to an anode of the second diode 510. The cathode of the first diode 508 is coupled to the high-side bus 108. The cathode of the second diode 510 is coupled to the high-side bus 108. A second end of the second winding of the first transformer 504 and a second end of the second winding of the second transformer 406 are coupled to the low-side bus 110.

With the topology of FIG. 5, the controller 140 can operate the switches 502, 503, in conjunction with the transformers 504, 506 to provide bus balancing where imbalanced energy is recuperated back to the DC busses 108, 110.

Figure 6:
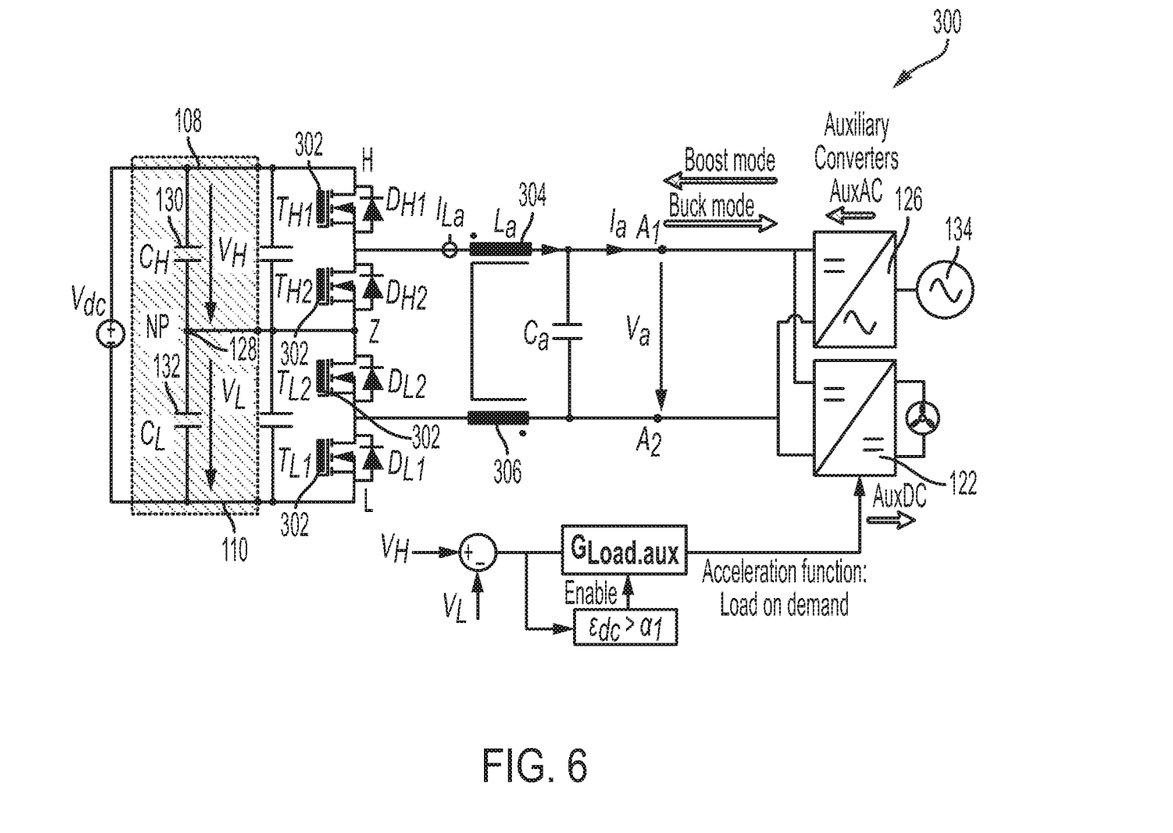
FIG. 6 is a schematic/block diagram of a control strategy for operating an interface converter in accordance with aspects of the present invention.

FIG. 6 is schematic/block diagram illustrating a control strategy for the interface converter having the topology shown in FIG. 3 (i.e., a non-isolated bi-directional converter 300). As described above, the interface converter 300 can be operated to provide power conditioning, bus balancing, and/or a pre-charge function. In at least one embodiment, the converter 300 can be operated in a buck or a boost mode.

For example, in order to achieve power conditioning with voltage regulation to generate DC power having a voltage level $V_a$ (i.e., to be provided to the first auxiliary DC-DC converter 122, the second auxiliary DC-DC converter 124, and the auxiliary AC-DC converter 126) and to provide DC bus balancing (i.e., $V_H = V_L$), the interface converter 300 can be operated in buck mode. The control of the interface converter 300 in step-down voltage conversion (i.e., buck mode) is performed when the DC bus voltage $V_{DC}$ is present at the input 102. In this case (selection function $F_s$=Buck mode) the output voltage $V_a$ of the interface converter 300 is adjusted by the voltage $G_{Vdc,aux}$ and current $G_{Idc,aux}$ regulators at the desired DC-bus level (e.g., 50V, 400V) necessary for other auxiliary supplies and circuits.

The DC-split-bus balance compensation is performed by the neutral-point (NP) voltage regulator $G_{Vdc,np}$ (e.g., as discussed above with respect to FIG. 2). The feed-forward action from the neutral-point (NP) voltage regulator $G_{Vdc,np}$ is combined to the $G_{Idc,aux}$ compensator and applied ($d_H$, $d_L$) to the modulator (e.g., the controller 140 acting as a Pulse Width Modulator). The control signals $d_H$, $d_L$ are compared with the carrier signals ($V_{cH}$, $V_{cL}$)∈[0,1]. The modulator and gate drive (GD) signals control the buck converter in synchronous fashion $V_{gH1}$, $V_{gH2}$, respectively $V_{gL1}$, $V_{gL2}$. Fast voltage balancing with automatic load on-demand control is performed by the $G_{Load,aux}$ regulator. If the voltage imbalance between $\varepsilon_{dc} = V_H - V_L$ exceeds a predetermined value ($\varepsilon_{dc} > \alpha_1$), then the load on-demand regulator $G_{Load,aux}$ is enabled, commanding a load increase. With this approach, the voltage imbalance can be reduced with increased dynamics (e.g., accelerated function).

In order to achieve DC precharge function of the high-side capacitor 130 and the low-side capacitor 132 for inrush current elimination and to provide DC balancing (i.e., $V_H = V_L$), the interface converter 300 can be operated in boost mode. Step-up (i.e., boost) voltage conversion is performed when it is desired to charge the capacitors 130, 132 before closing the input 104 or output 114 switches of the system 100 to reduce stress, wear-out, or failures during transient conditions. The auxiliary AC-DC converter 126 is powered-up from the AC grid, as discussed above. If the DC bus capacitance (i.e., $C_H + C_L$) is discharged below the output voltage $V_a$ of the interface converter 300, the auxiliary AC-DC converter 126 operates in power limit mode, until $V_H + V_L = V_a$ is satisfied. Once this condition is satisfied, the interface converter 300 operates in boost mode (i.e., selection function $F_s$=Boost mode).

According to at least one embodiment, with the interface converter 300 operating in boost mode, the inverter portion 112 (e.g., shown in FIG. 1) can operate in grid-connected mode, with reactive power support, in the absence of the PV array 101/EES device 103. Prior to grid connection (i.e., prior to the output switch 114 being closed), the auxiliary AC-DC converter 126 generates the voltage $V_a$, from which the interface converter 300 pre-charges and balances the voltage of each capacitor 130, 132.

As described above, an EES device 136 (e.g., a mini-EES system) can be coupled to the interface converter 120, the first auxiliary DC-DC converter 122, the second auxiliary DC-DC converter 124, and the auxiliary AC-DC converter 126 and such an EES device 136 can smooth the PV array 101 production and enhance grid stability. In operating the EES device 136 to provide smoothing, the interface converter 120 is operated in buck/boost modes for charging/discharging of the EES device 136. In buck mode, power balancing for grid stabilization support is provided by the EES device 136 by absorbing sudden energy transients from the PV array 101. In boost mode, power balancing for grid stabilization support is provided by the EES device 136 by discharging to provide support to input power during sudden PV array 101 power collapse. Control of the EES device 136 and the interface controller 300 is discussed in greater detail below.

The issue of variability in power production of grid-connected renewable sources, can lead to grid instabilities. For example, a sudden increase or decrease of PV energy, due to irradiance availability, can result in a grid disturbance. Alternatively, the power balancing feature discussed herein can mitigate grid disturbances by controlling the rate of change in output power to the grid. For example, with reference to the control strategy shown in FIG. 6 the power balancing/smoothing controller $G_P$ enables the selection function for buck or boost mode of operation. The momentary grid power gradient ($dP_m/dt$) is monitored and the system controller (e.g., controller 140) selects the operation of the interface converter 300 in buck or boost mode, depending of the sign of the power gradient. For example, if the power gradient exceeds a certain threshold ($dP_m/dt > dP_{Lim}/dt$), then the power balancing/smoothing controller GP enables the selection function for buck or boost mode of operation. Buck mode is engaged when the surplus of PV power is diverted to the EES device 136 for smoothing the grid power production. When PV energy collapses, the boost mode is engaged for smoothing the grid power production. According to one embodiment, the internal EES device 136 is designed to maintain an adaptive State-of-Charge (SoC, e.g., 75%-90%) to maintain a certain capacity which is able to absorb or deliver necessary power.

As described above, the control strategy shown in FIG. 6 is implemented with an interface converter 300 having the topology shown in FIG. 3; however, in other embodiments, the control strategy can be implemented with an interface converter having a different topology (e.g., the topologies of FIGS. 4-5).

As discussed above, the controller 140 is configured to monitor and control operation of the inverter 100. Using data stored in associated memory, the controller 140 is operable to execute one or more instructions that may result in the manipulation of one or more switches' conductive states. In some examples, the controller 140 can include one or more processors or other types of controllers. The controller 140 may perform a portion of the functions discussed herein on a processor, and perform another portion using an Application-Specific Integrated Circuit (ASIC) tailored to perform particular operations. Examples in accordance with the present invention may perform the operations described herein using many specific combinations of hardware and software and the invention is not limited to any particular combination of hardware and software components.

According to one embodiment, the interface converter (and/or the optional internal EES device) described above can be designed at a fraction (e.g., 1:5) of the main inverter's rated power.

A power converter architecture is provided that integrates DC voltage balancing and power supply features for renewable energy-based multilevel power converters. The architecture provides a control structure that performs both DC balancing at an input port and voltage regulation at an output port. The architecture can also operate a pre-charge function for start-up initializing conditions to reduce inrush current and operate to reduce DC ripple for higher DC-bus voltage utilization. In addition, with a higher rated power capability of the architecture, ripple at a Neutral Point (NP) can be dampened, thereby extending DC voltage utilization. As described above, the voltage balancing and extension of DC bus voltage (i.e., NP compensation) can be achieved at any mode of the corresponding power system, including inverter operation at any power factor or inverter stand-by mode.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only

What is claimed is:

1. A renewable energy-based power converter comprising:
   an input configured to be coupled to a renewable energy-based power source and to receive input DC power having an input DC voltage level;
   a high-side DC bus;
   a low-side DC bus;
   a first output configured to be coupled to an AC grid;
   an inverter portion coupled to the high-side DC bus and the low-side DC bus and configured to convert DC power from the high-side DC bus and the low-side DC bus into output AC power and provide the output AC power to the first output;
   an interface converter coupled to the high-side DC bus and the low-side DC bus;
   a first auxiliary DC-DC converter coupled to the interface converter and configured to be coupled to a first DC load; and
   a controller coupled to the interface converter,
   wherein, in a first mode of operation, the high-side DC bus and the low-side DC bus are configured to receive the input DC power from the input, and the controller is configured to operate the interface converter to convert DC power from the high-side DC bus and the low-side DC bus into regulated DC power having a regulated DC voltage level, to operate the interface converter to balance a first voltage level on the high-side DC bus with a second voltage level on the low-side DC bus; and to operate the first auxiliary DC-DC converter to convert the regulated DC power into first output DC power provided to the first DC load.

2. The renewable energy-based power converter of claim 1, wherein the inverter portion includes a 3-level neutral-point clamped inverter.

3. The renewable energy-based power converter of claim 1, further comprising:
   a neutral point;
   a high-side capacitor coupled between the high-side DC bus and the neutral point; and
   a low-side capacitor coupled between the low-side DC bus and the neutral point,
   wherein in operating the interface converter to balance the first voltage level on the high-side DC bus with the second voltage level on the low-side DC bus, the controller is further configured to operate the interface converter to balance the first voltage level across the high-side capacitor with the second voltage level across the low-side capacitor.

4. The renewable energy-based power converter of claim 3, wherein in operating the interface converter to balance the first voltage level across the high-side capacitor and the second voltage level across the low-side capacitor, the controller is further configured to operate the interface converter to load at least one of the high-side DC bus and the low-side DC bus with resistance.

5. The renewable energy-based power converter of claim 3, further comprising a second auxiliary DC-DC converter coupled to the interface converter and configured to be coupled to a second DC load,
   wherein, in the first mode of operation, the controller is further configured to operate the second auxiliary DC-DC converter to convert the regulated DC power into second output DC power provided to the second DC load.

6. The renewable energy-based power converter of claim 3, further comprising an input switch coupled to the input, wherein the controller is further configured, in the first mode of operation, to operate the input switch to couple the input to the high-side DC bus and the low-side DC bus.

7. The renewable energy-based power converter of claim 6, further comprising an auxiliary AC-DC converter coupled to the first output and the interface converter,
wherein, in a second mode of operation, the controller is further configured to operate the input switch to decouple the input from the high-side DC bus and the low-side DC bus, to operate the auxiliary AC-DC converter to convert AC power from the AC grid into the regulated DC power having the regulated DC voltage level, to operate the interface converter to convert the regulated DC power into DC bus power to charge the high-side capacitor and the low-side capacitor, and to operate the interface converter to balance the first voltage level across the high-side capacitor and the second voltage level across the low-side capacitor.

8. The renewable energy-based power converter of claim 7, wherein the controller is further configured to operate in the second mode of operation prior to operating in the first mode of operation.

9. The renewable energy-based power converter of claim 8, further comprising an output switch coupled between the inverter portion and the first output, wherein the controller is further configured to operate the output switch to decouple the first output from the inverter portion in the second mode of operation and to couple the first output to the inverter in the first mode of operation.

10. The renewable energy-based power converter of claim 1, further comprising an Electric Energy Storage (EES) device coupled to the interface converter and the first auxiliary DC-DC converter.

11. The renewable energy-based power converter of claim 1, further comprising a second output coupled to the inverter portion and configured to be coupled to an AC load, wherein the inverter portion is further configured to provide the output AC power to the AC load via the second output.

12. The renewable energy-based power converter of claim 1, wherein the interface converter includes a non-isolated bi-directional converter.

13. The renewable energy-based power converter of claim 1, wherein the interface converter includes an isolated bi-directional converter.

14. A method for operating a renewable energy-based power converter including an input configured to be coupled to a renewable energy-based power source, a high-side DC bus, a low-side DC bus, and an output configured to be coupled to an AC grid, wherein the method comprises:
receiving, at the input, input DC power from the renewable energy-based power source;
providing, in a first mode of operation, the input DC power to the high-side DC bus and the low-side DC bus;
converting, in the first mode of operation with an inverter portion, DC power from the high-side DC bus and the low-side DC bus into output AC power;
providing, in the first mode of operation, DC power from the high-side DC bus and the low-side DC bus to an interface converter;
converting, in the first mode of operation with the interface converter, DC power from the high-side DC bus and the low-side DC bus into regulated DC power having a regulated DC voltage level;
converting, in the first mode of operation with a first auxiliary DC-DC converter, the regulated DC power into first output DC power;
providing the first output DC power to a first DC load; and balancing, in the first mode of operation with the interface converter, a voltage level of the high-side DC bus with a voltage level of the low-side DC bus.

15. The method of claim 14, wherein the renewable energy-based power converter further includes a neutral point, a high-side capacitor coupled between the high-side DC bus and the neutral point, and a low-side capacitor coupled between the low-side DC bus and the neutral point, and wherein balancing includes balancing the voltage level across the high-side capacitor with the voltage level across the low-side capacitor.

16. The method of claim 15, wherein balancing further includes loading at least one of the high-side DC bus and the low-side DC bus with a virtual resistance.

17. The method of claim 15, further comprising:
converting, in the first mode of operation with a second auxiliary DC-DC converter, the regulated DC power into second output DC power; and
providing the second output DC power to a second DC load.

18. The method of claim 15, further comprising:
decoupling, in a second mode of operation, the input from the high-side DC bus and the low-side DC bus;
converting, in the second mode of operation with an auxiliary AC-DC converter, AC power from the AC grid into the regulated DC power having the regulated DC voltage level;
converting, in the second mode of operation with the interface converter, the regulated DC power into DC bus power;
charging, with the DC bus power, the high-side capacitor and the low-side capacitor; and
balancing, in the second mode of operation, the first voltage level across the high-side capacitor and the second voltage level across the low-side capacitor.

19. The method of claim 18, further comprising coupling, in the first mode of operation, the input to the high-side DC bus and the low-side DC bus,
wherein decoupling, in the second mode of operation, is performed prior to coupling, in the first mode of operation.

20. A renewable energy-based power converter comprising:
an input configured to be coupled to a renewable energy-based power source and to receive input DC power having an input DC voltage level;
a high-side DC bus;
a low-side DC bus;
a neutral point;
a high-side capacitor coupled between the high-side DC bus and the neutral point;
a low-side capacitor coupled between the low-side DC bus and the neutral point;
an output configured to be coupled to an AC grid;
an inverter portion coupled to the high-side DC bus and the low-side DC bus and configured to operate to convert DC power from the high-side DC bus and the low-side DC bus into output AC power and provide the output AC power to the output; and
means for providing regulated DC power, derived from the input DC power, to at least one DC subsystem, for balancing a first voltage level on the high-side DC bus with a second voltage level on the low-side DC bus, and for pre-charging, prior to operating the inverter portion to convert DC power from the high-side DC bus and the low-side DC bus into output AC power, the high-side capacitor and the low-side capacitor.

* * * * *